United States Patent
Olson

(10) Patent No.: US 9,355,758 B2
(45) Date of Patent: *May 31, 2016

(54) HELICAL TENSIONER FOR TENSION MEMBERS

(71) Applicant: Billy Olson, The Hague (NL)

(72) Inventor: Billy Olson, The Hague (NL)

(*) Notice: Subject to any disclaimer, the term of this patent is extended or adjusted under 35 U.S.C. 154(b) by 449 days.

This patent is subject to a terminal disclaimer.

(21) Appl. No.: 13/939,254

(22) Filed: Jul. 11, 2013

(65) Prior Publication Data

US 2013/0312225 A1 Nov. 28, 2013

Related U.S. Application Data

(63) Continuation-in-part of application No. 11/533,107, filed on Sep. 19, 2006, now Pat. No. 8,523,719.

(51) Int. Cl.
*H01B 9/00* (2006.01)
*H02G 7/02* (2006.01)

(52) U.S. Cl.
CPC .............. *H01B 9/008* (2013.01); *H02G 7/02* (2013.01); *Y10T 24/2164* (2015.01)

(58) Field of Classification Search
CPC ....... H01B 9/008; H02G 7/02; Y10T 24/2164
See application file for complete search history.

(56) References Cited

U.S. PATENT DOCUMENTS

| 1,200,076 A | 10/1916 | Burgess |
| 2,052,541 A | 8/1936 | Roberts et al. |
| 2,423,211 A | 7/1947 | Vanselow |
| 2,610,633 A | 9/1952 | Jozwik |
| 2,736,398 A | 2/1956 | Peterson |
| 3,069,491 A | 12/1962 | Hayden et al. |
| 3,163,706 A | 12/1964 | Peterson |
| 3,250,515 A | 5/1966 | Hudnall et al. |
| 3,251,161 A | 5/1966 | Stirn |
| 3,302,346 A | 2/1967 | Williams et al. |
| 3,801,726 A | 4/1974 | Kurihara et al. |
| 3,899,629 A | 8/1975 | Hawkins |
| 6,372,984 B1 | 4/2002 | Wang |
| 6,646,208 B1 | 11/2003 | Tseng |

FOREIGN PATENT DOCUMENTS

| GB | 2245432 | 2/1992 |
| JP | 1-110012 | 4/1989 |

*Primary Examiner* — Robert J Sandy
*Assistant Examiner* — Louis Mercado
(74) *Attorney, Agent, or Firm* — Eckert Seamans Cherin & Mellott, LLC; David C. Jenkins

(57) ABSTRACT

A tensioner structured to shorten the effective length of a tension member is provided. The tensioner has a body with an outer surface and a generally helical path on the outer surface. The tension member is wrapped around the tensioner body and retained in the path. In this configuration, the tensioner acts to retain a first length of the tension member within a second, shorter length corresponding to the length of the tensioner body. When the effective length of a tension member is reduced, the amount of sag in the tension member is reduced.

16 Claims, 9 Drawing Sheets

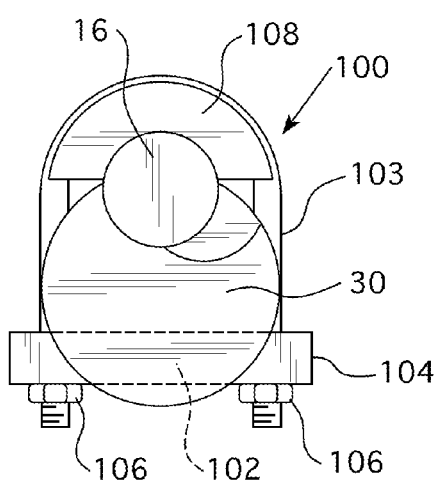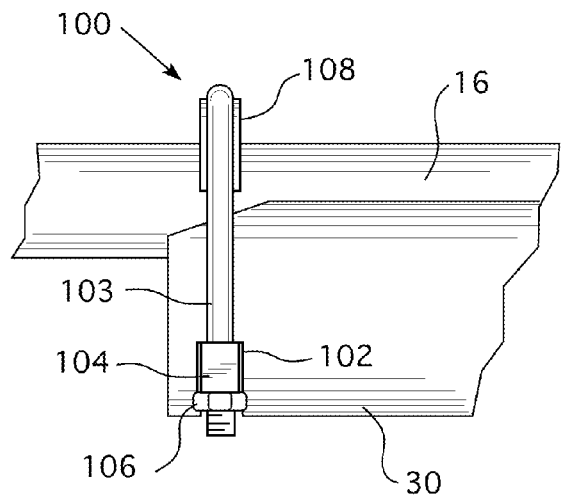
FIG. 6    FIG. 7
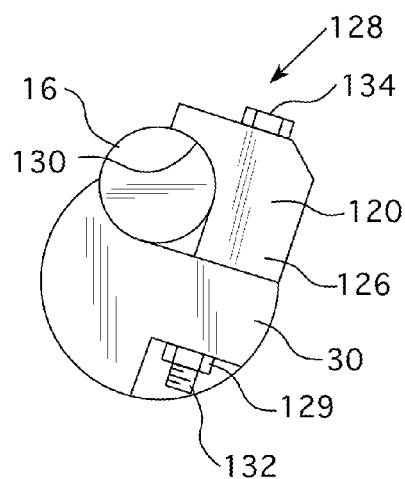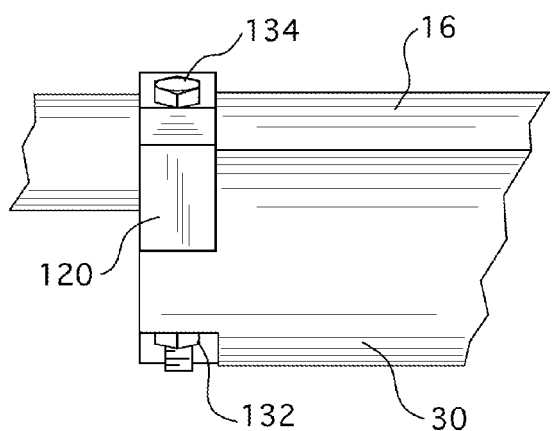
FIG. 8    FIG. 9

HELICAL TENSIONER FOR TENSION MEMBERS

CROSS REFERENCE TO RELATED APPLICATION

This application is a continuation-in-part application to U.S. application Ser. No. 11/533,107, filed Sep. 19, 2006, now issued U.S. Pat. No. 8,523,719, entitled "Helical Tensioner for Tension Members."

BACKGROUND OF THE INVENTION

1. Field of the Invention

This invention relates to tension members, such as, but not limited to power lines, and, more specifically, to a tensioner structured to reduce the amount of sag in a suspended tension member.

2. Background Information

A tension member is any type of body that is substantially rigid when in tension but not substantially rigid when compressed. One of the most common types of tension member is a power line suspended between two towers or poles. Other tension members include, but are not limited to, guy wires, suspended telephone lines, cordage on a ship, or any other suspended rope, cable, cord, or chain. Tension members may be placed under an external tension, such as a guy wire used to support a tower, or the tension may be created by the weight of the tension member itself, such as the aforementioned power line suspended between two towers. With regard to the latter, a suspended tension member generally has a certain amount of sag between the two support points. The greater the length of the tension member relative to the distance between the two support points, the greater the amount of the sag. That is, given two support points set at a fixed distance from each other, a tension member of a first length, which is greater than the fixed distance, sags a set distance relative to a straight line between the two points. Another tension member having a second length that is greater than the first length will sag a greater distance relative to a straight line between the two points than the first tension member. As is known in the art, in addition to the length of the tension member relative to the distance between the two support points, the amount of sag is also controlled by various factors such as, but not limited to, the elasticity and temperature of the tension member.

The sag of a suspended tension member may be a disadvantage, such as when a power line sags to a point in proximity with a structure, tree, or another power line. While the amount of sag may be calculated, or observed, when the tension member is installed, the acceptable amount of sag may change over time. For example, a new building or other structure below the power line may be built, a tree or other foliage may grow to be too close to the power line, or the electrical capacity required of the line may change. Thus, what was once an acceptable amount of sag may become unacceptable. One option in such situations is to replace the entire tension member. This option can be time consuming and expensive.

There is, therefore, a need for a tensioner structured to take up the sag within a tension member that is installed between two points.

There is a further need for a tensioner that may be easily installed and removed.

There is a further need for a tensioner that is inexpensive.

SUMMARY OF THE INVENTION

These needs, and others, are met by at least one embodiment of this invention which provides a tensioner having a body with an outer surface and a generally helical path on the outer surface. The tension member is wrapped around the tensioner body and retained in the path. In this configuration, the tensioner acts to retain a first length of the tension member within a second, shorter length. As such, the amount of sag in the tension member is reduced. That is, the tensioner effectively shortens the tension member with respect to the length of the tension member that is free to sag. As noted above, when the distance between the two support points is fixed, a shorter tension member sags less than a longer tension member.

BRIEF DESCRIPTION OF THE DRAWINGS

A full understanding of the invention can be gained from the following description of the preferred embodiments when read in conjunction with the accompanying drawings in which:

FIG. 6 is an end view of a clamping device on the tensioner.

FIG. 7 is a side view of the clamping device of FIG. 6 on the tensioner.

FIG. 8 is an end view of another clamping device on the tensioner.

FIG. 9 is a side view of the clamping device of FIG. 8 on the tensioner.

DESCRIPTION OF THE PREFERRED EMBODIMENTS

Figure 1:
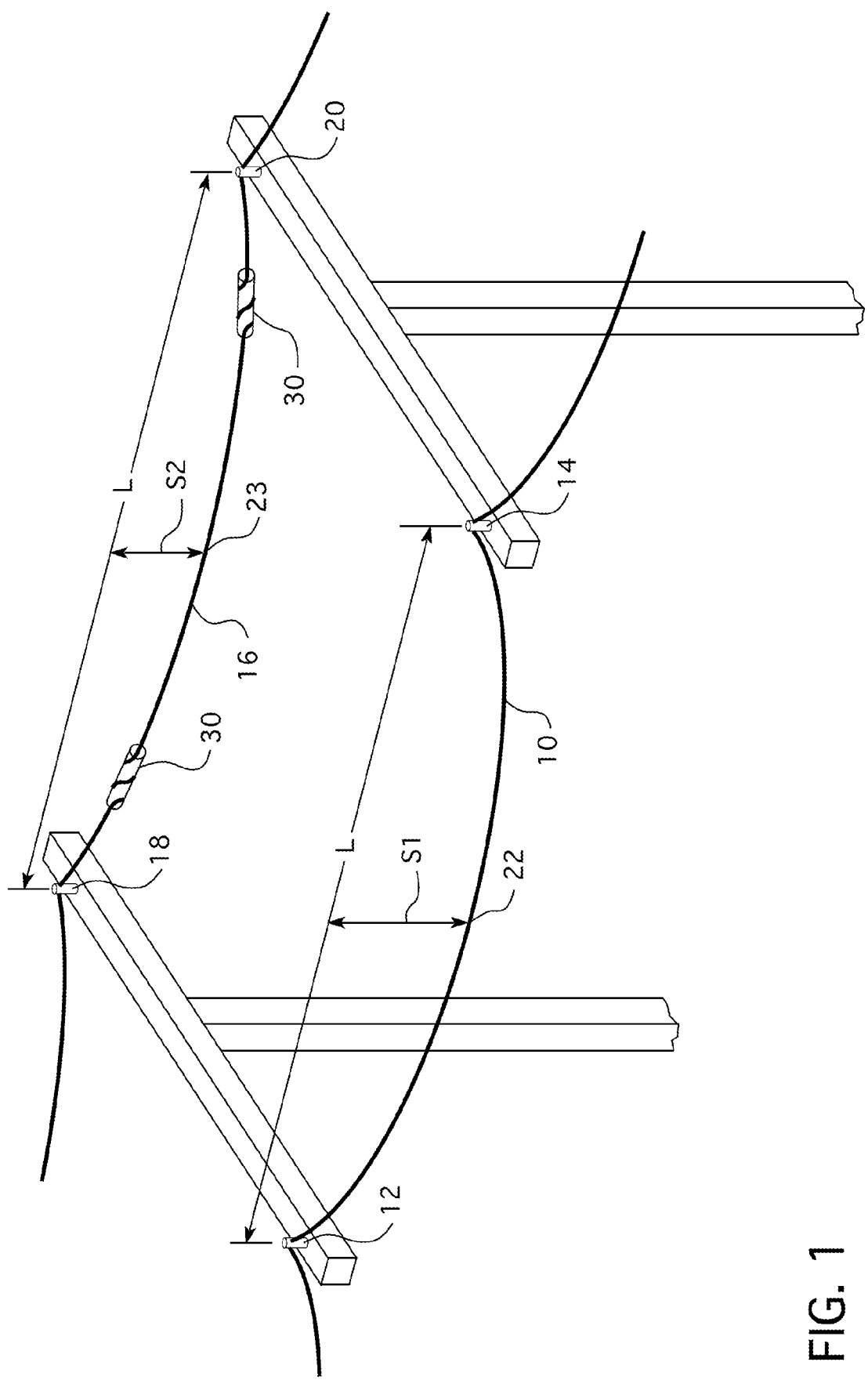
FIG. 1 is an isometric view of tension members suspended between two points.

As used herein, the phrase "effective length" when used in reference to a tension member means the portion of the tension member that is free to sag.

As used herein, "pitch" when used in reference to a path about a body means the number of revolutions about that body over a standard length, typically inches. Thus, a pitch of 1.0 rev/in. means that over a length of one inch, the path extends 360 degrees about the body. Conversely, a pitch of 0.25 rev/in. means that over a length of one inch, the path extends 90 degrees about the body and a pitch of 0.5 rev/in. means that over a length of one inch, the path extends 180 degrees about the body. The "pitch," with respect to the tensioner 30 (described below), may be either "clockwise" or "counter-clockwise." That is, "clockwise" or "counter-clockwise," with respect to an axis of rotation, describe the direction of rotation along the transverse of the axis. As shown in the Figures, the pitch transverses the tensioner 30 in a "clockwise" manner.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof.

As used herein, the statement that two or more parts or components "engage" one another shall mean that the elements exert a force or bias against one another either directly or through one or more intermediate elements or components.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit. Further, with regard to a surface formed by two or more elements, a "corresponding" shape means that surface features, e.g. curvature, are similar.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies.

Figure 2:
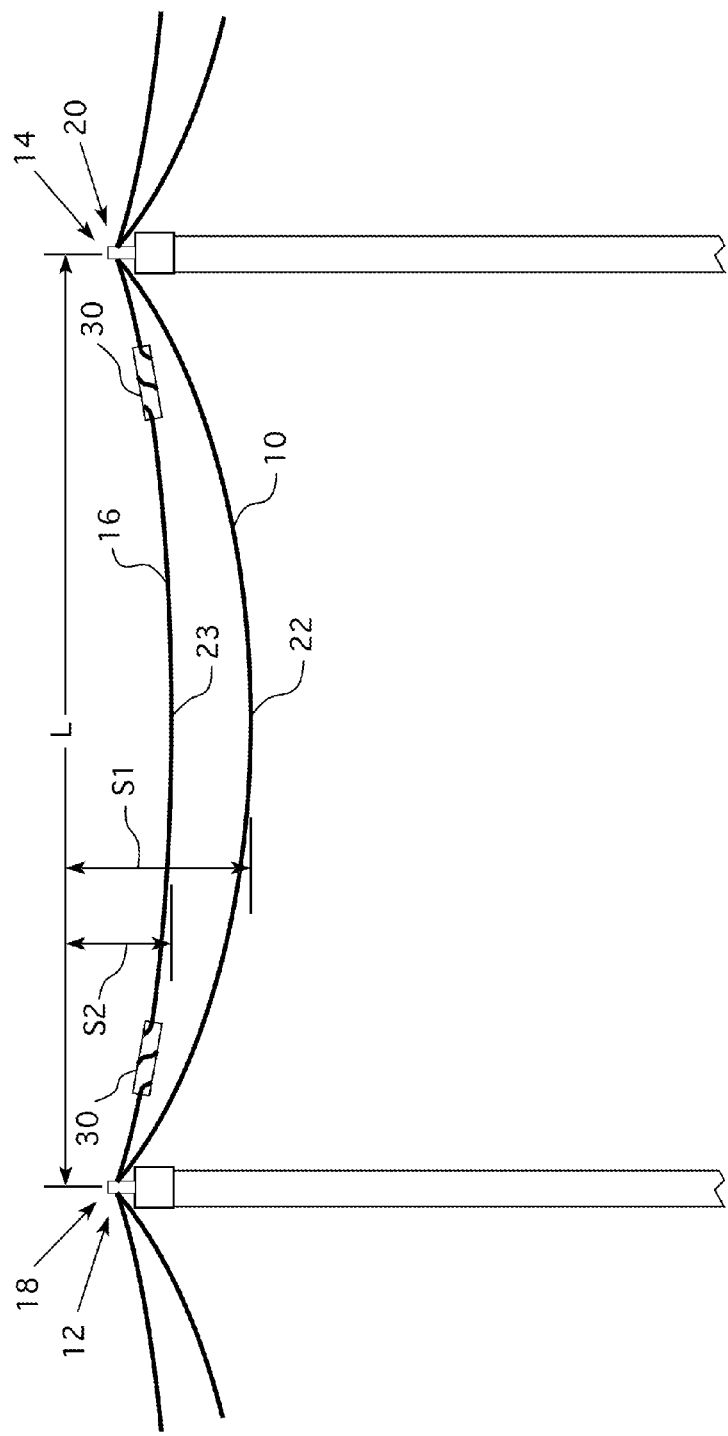
FIG. 2 is a schematic side view of tension members suspended between two points.

As shown in FIGS. 1 and 2, an unencumbered tension member 10 is suspended between a first pair of spaced apart points 12, 14. Another tension member 16 having at least one tensioner 30, discussed below, is suspended between a second pair of spaced apart points 18, 20. Preferably, the tension members 10, 16 have a generally circular cross-sectional area with a diameter, however, additional material may be removed for weight savings, material savings or improved thermal conductivity properties of the tensioner 30 so long as the described helical path is conserved. The distance, represented by the horizontal line "L," between the points 12, 14 in the first pair of spaced apart points 12, 14 is about the same as the distance between the points 18, 20 in the second pair of spaced apart points 18, 20. The first tension member 10 and the second tension member 16 have the same length. The entire length of the first tension member 10 is free to sag. Thus, the effective length of the first tension member 10 is equivalent to the total length of the first tension member 10. A medial point 22 on the first tension member 10 sags a distance, represented by line "S1," below the horizontal line L. As set forth in greater detail below, the second tension member 16 includes at least one tensioner 30. The tensioner 30 is structured to reduce the effective length of the second tension member 16. Thus, a medial point 23 on the second tension member 16 sags a distance, represented by line "S2," below the horizontal line L. Because the effective length of the second tension member 16 is less than the effective length of the first tension member 10, the amount of sag of the second tension member 16 is reduced relative to the first tension member 10. The first tension member 10 is shown so as to make a comparison with the second tension member 16. An unencumbered tension member 10 is not required to practice this invention.

Figure 3:
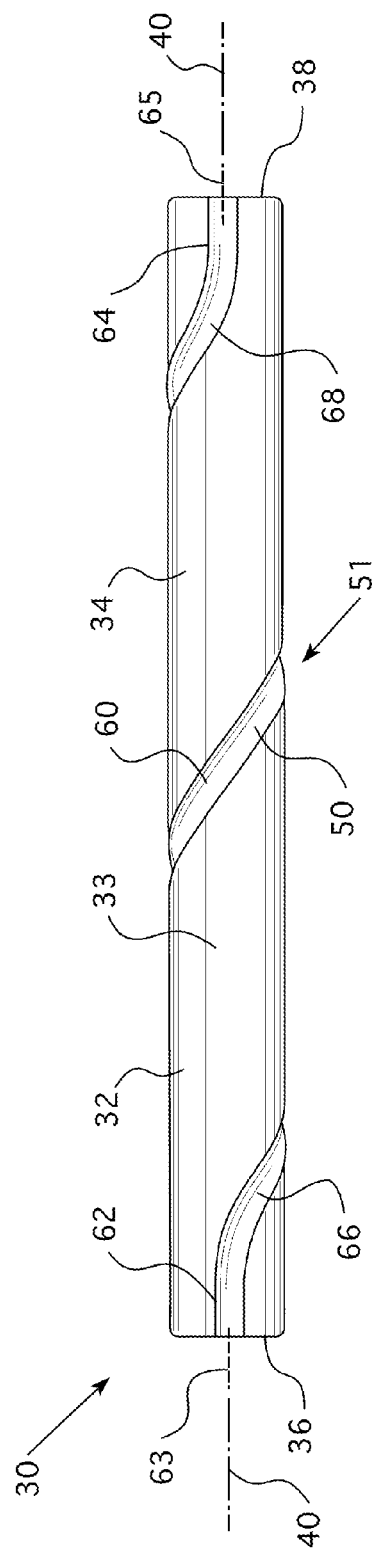
FIG. 3 is a top view of a tensioner.
Figure 4:
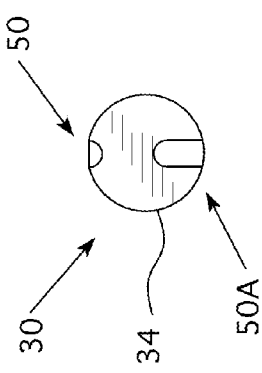
FIG. 4 is an end view of a tensioner.

As shown in FIGS. 3 and 4, the tensioner 30 includes an elongated body 32, preferably a cylindrical body 32, having an outer surface 34, a first end 36, a second end 38, and a longitudinal axis 40. The body 32 may also include one or more generally flat platforms and openings or bores (not shown) structured to be engaged by an installation tool set. The length of the tensioner 30 is less than the length of the tension member 16. A generally helical path 50 is disposed on the body outer surface 34. The helical path 50 is sized to accommodate at least a portion of the length of the tension member 16. As described below, the tension member 16 is wrapped around the body 32 and retained in the path 50. In this configuration, the tensioner 30 acts to retain a first length of the tension member 16 within a second, shorter length corresponding to the length of the body 32. The helical path 50, and more specifically the center of the helical path 50, has a "diameter" relative to the center of the cylindrical body 32.

Further, the helical path 50, preferably, has a cross-sectional shape that corresponds to at least a portion of the cross-sectional shape of the tension member 16. Thus, in an embodiment wherein the tension member 16 has a circular cross-sectional area, the helical path 50 has a bottom that is a circular segment shaped cross-sectional area. The helical path 50 may be less deep than the diameter of the tension member 16 and, in this configuration, the helical path 50 has only a circular segment shaped cross-sectional area (FIG. 4). Alternately, the helical path 50A may be deeper than the diameter of the tension member 16. In this configuration, the bottom of the helical path 50A is a circular segment shaped cross-sectional area extending over 180 degrees. Further, in this embodiment, the sides of the helical path 50A are generally parallel and extend generally tangent to each side of the circular segment shaped cross-sectional area at the bottom of the helical path 50A.

The helical path 50 extends about the body 32 at pitch. For example, if the tension member 16 is a 795 Kcmil ACSR 45/7 "TERN" power line having a diameter of about 1.063 in., the pitch of the helical path 50 is between about 0.04 and 0.06 rev./in., and more preferably about 0.0556 rev./in. Further, for use on such a power line, the body 32 has a length of between about 30 and 40 inches, and more preferably about 36.0 inches. The diameter of the helical path 50 is between about 2.5 and 4.0 inches, and more preferably about 3.0 inches. The diameter of the body 32, which is always larger than the diameter of the helical path 50, is between 2.75 and 5.0 inches, and more preferably about 3.5 inches. Thus, in the preferred embodiment, where the body 32 has a length of 36.0 inches, the pitch is 0.0556 rev./in., and the diameter of the helical path is 3.0 inches, the helical path 50 has a length of about 40.5 inches. The length of the helical path 50 is, by definition, longer than the length of the tensioner 30, i.e., 36.0 inches.

With a tensioner 30 in this configuration, a portion of the length of the tension member 16 may be wrapped around the body 32 with the tension member 16 cross-sectional shape being at least partially disposed within the helical path 50. Alternately, if the helical path 50A is deeper than the diameter of the tension member 16, the tension member 16 cross-sectional shape is entirely disposed within the helical path 50A. The length of the portion of the tension member 16 disposed in the helical path 50 is equivalent to the length of the helical path 50. As noted above, the length of the helical path 50 is, by definition, longer than the length of the tensioner 30. Thus, the effective length of the second tension member 16 is reduced. When the effective length of the tension member 16 is reduced there is a corresponding reduction in the sag of the tension member 16. The sag of the tension member 16 may be further reduced by installing multiple tensioners 30 on the tension member 16.

In one embodiment of the tensioner 30, the generally helical path 50 includes a helical portion 60 and at least one, and preferably a first and second, elongated axial path 62, 64. Each axial path 62, 64 has a longitudinal axis 63, 65. Each axial path 62, 64 is, preferably, disposed at each end 36, 38 of the body 32. Each axial path 62, 64 extends generally parallel to the body longitudinal axis 40. Between each axial path 62, 64 and the helical portion 60 is a transition path 66, 68. Because some tension members 14, 16 have limited flexibility, the transition path 66, 68 allows for a defined transition between the generally straight portion of the tension member 16 located in the axial path 62, 64 and the generally helical portion 60 of the second tension member 16 located in the helical portion 60. Further, it is generally desirable to have the body 32 hang below the second tension member 16 when installed. To accomplish this, the first axial path longitudinal axis 63 and the second axial path longitudinal axis 65 are generally aligned with each other on the body outer surface 34. In this configuration, when the tensioner 30 is installed, the weight of the body 32 will typically twist the second tension member 16 until the body 32 is disposed generally below the tension member 16. Thus, the axial paths 62, 64 may be said to be on an upper side 33 of the body 32.

Alternately, if the helical path 50 does not have any axial paths 62, 64, the helical path 50 is preferably constructed so that the number of revolutions about the body 32 is an integer. That is, the helical path 50 may be constructed so that the tip of the helical path 50 at the body first end 36 is generally aligned with the tip of the helical path 50 at the body second end 38. Again, in this configuration, when the tensioner 30 is installed, the weight of the body 32 will typically twist the tension member 16 until the body 32 is disposed generally below the tension member 16. Thus, tips of the helical path 50 may be said to be on an upper side 33 of the body 32. In certain situations, however, the position of the body 32 relative to the tension member 16 is not important and the tip of the helical path 50 at the body first end 36 does not have to be generally aligned with the tip of the helical path 50 at the body second end 38. That is, the number of revolutions about the body 32 made by the helical path 50 is not an integer.

Figure 5:
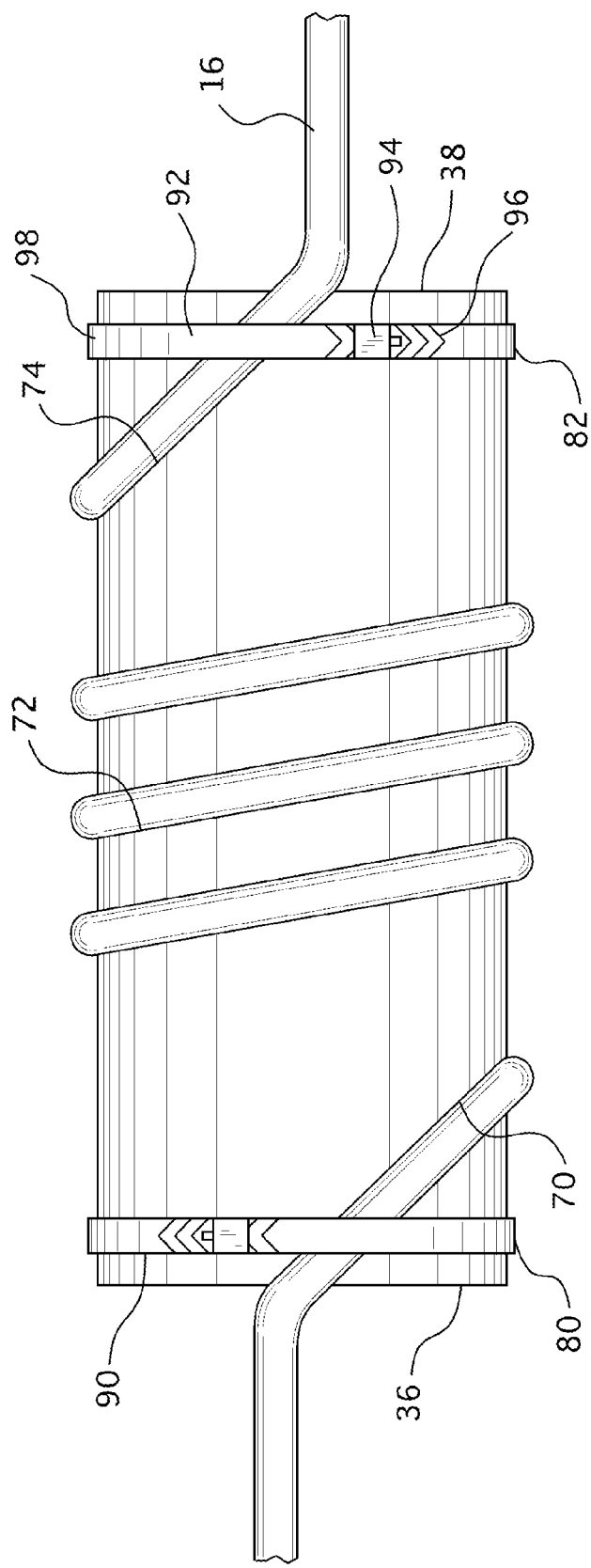
FIG. 5 is a top view of an alternate embodiment of the tensioner.

The generally helical path 50 may also include at least two portions 70, 72 each having a different pitch. That is, as shown in FIG. 5, the helical path 50 may have a first portion 70 with a first pitch and a second portion 72 with a second pitch. Preferably, the helical path 50 is symmetrical and, as such, there is preferably a third portion 74 having generally the same pitch as the first portion 70. Alternately, the pitch may gradually change over the length of the body 32. Again, in a preferred embodiment, the degree of pitch of the helical path 50 is generally symmetric about a medial point on the body 32.

The tensioner 30 may also include at least one, and preferably a first and second, clamping device 80, 82. The clamping devices 80, 82 are structured to bias the portion of the tension member 16 that engages the tensioner 30 toward the bottom of the helical path 50. The clamping devices 80, 82 may be, but are not limited to, a tightenable band 90 structured to be disposed about the body 32 and any portion of the tension member 16 that extends above the helical path 50.

The clamping device 80, 82 may apply bias to the tension member 16 or the tension member 16 may apply bias to the clamping device 80, 82. That is, when a tensioner 30 is installed, the tension member 16 is biased out of helical path 50 due to the rigidity of the tension member 16, and/or, due to the tension in the tension member 16. Thus, the tension member 16 applies a bias to the clamping device 80, 82. Further, the clamping device 80, 82 may apply a bias to the tension member 16.

For example, the band 90 is movable between a loose, first configuration, a retaining, second configuration, and a tight, third configuration. That is, in an exemplary embodiment, the band 90 includes an elongated member 92 and an adjustment assembly 94. The elongated member 92 includes latching members 96 that are structured to engage, or be engaged by, the adjustment assembly 94. As is known, one type of such a band 90 is known as hose clamp 98 (sometimes identified as a radiator hose clamp) and another type is known as a tie-wrap or zip-tie (none shown).

In use, the band 90 is initially in the loose, first configuration and is disposed about the tensioner 30 while the tension member 16 is disposed in the helical path 50. The band 90 is moved into the retaining, second configuration. That is, in the second configuration, the band 90 is disposed about the tensioner 30 while being sufficiently tight so as to retain the tension member 16 in the helical path 50. By way of a non-limiting example, the body 32 has a diameter of 2.0 inches, the helical path 50 is 0.5 inch deep, and the tension member 16 has a diameter of 1.0 inch. In this configuration, the maximum diameter of the band 90 occurs at the location the band 90 extends over the tension member 16. In this exemplary embodiment, the maximum diameter of the band 90 may be 2.6 inches. That is, even though a diameter of 2.6 inches is greater that the diameter of the body 32 plus the portion of the tension member 16 extending out of the helical path 50 (i.e. 2.0 inches+0.5 inches=2.5 inches), the band 90 maintains the tension member 16 in the helical path 50 because the band 90 does not allow the tension member 16 to escape the helical path 50. As noted above, the tension member 16 is generally biased out of the helical path 50, thus the tension member 16 applies bias to the band 90 in the second configuration.

Alternatively, the band 90 may be moved into the third configuration, i.e. tightened, until the maximum diameter of the band is the same as, or slightly less than, the diameter of the body 32 and the exposed portion of the tension member 16, in this example 2.5 inches. In this configuration, the band 90 applies bias to the tension member 16. Accordingly, as used herein, a "clamping device" 80 includes devices that apply bias to a tension member 16 as well as devices that resist the bias applied by a tension member 16.

As shown in FIGS. 6 and 7, the clamping device 80, 82 may also be a U-bolt clamp 100. In this exemplary embodiment, the body 32 includes a cavity 102 disposed generally opposite the helical path 50. The U-bolt clamp 100 includes a U-member 103 and a cross-member 104, as is known. The cavity 102 is sized to correspond to the U-bolt clamp 100 cross-member 104. The ends of the U-member 103 are threaded and coupling components, nuts 106, are coupled thereto. The U-bolt clamp 100, in an exemplary embodiment, includes a saddle 108, i.e. a resilient member that is disposed between the tension member 16 and the U-member 103.

Figure 10:
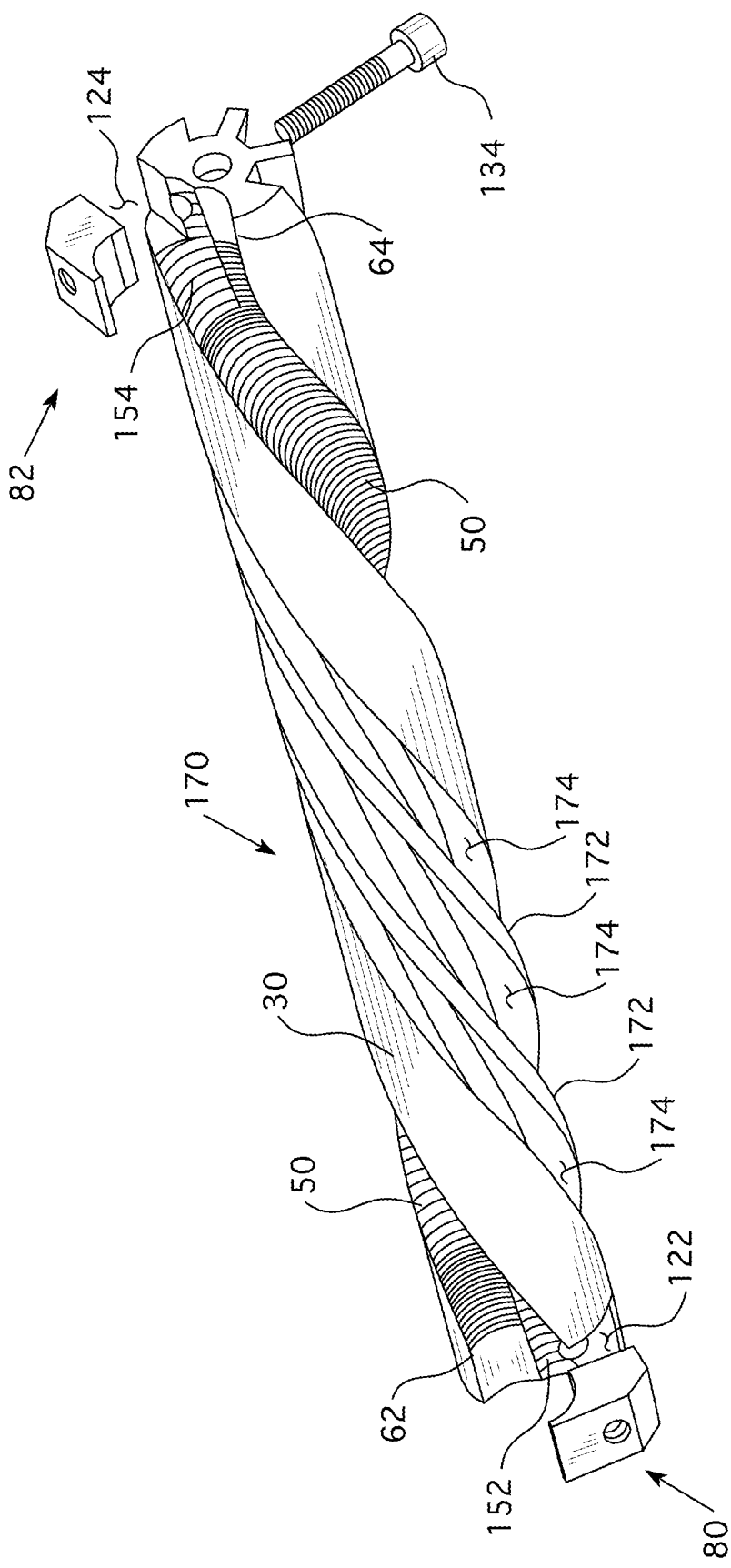
FIG. 10 is an isometric view of another clamping device on the tensioner.
Figure 11:
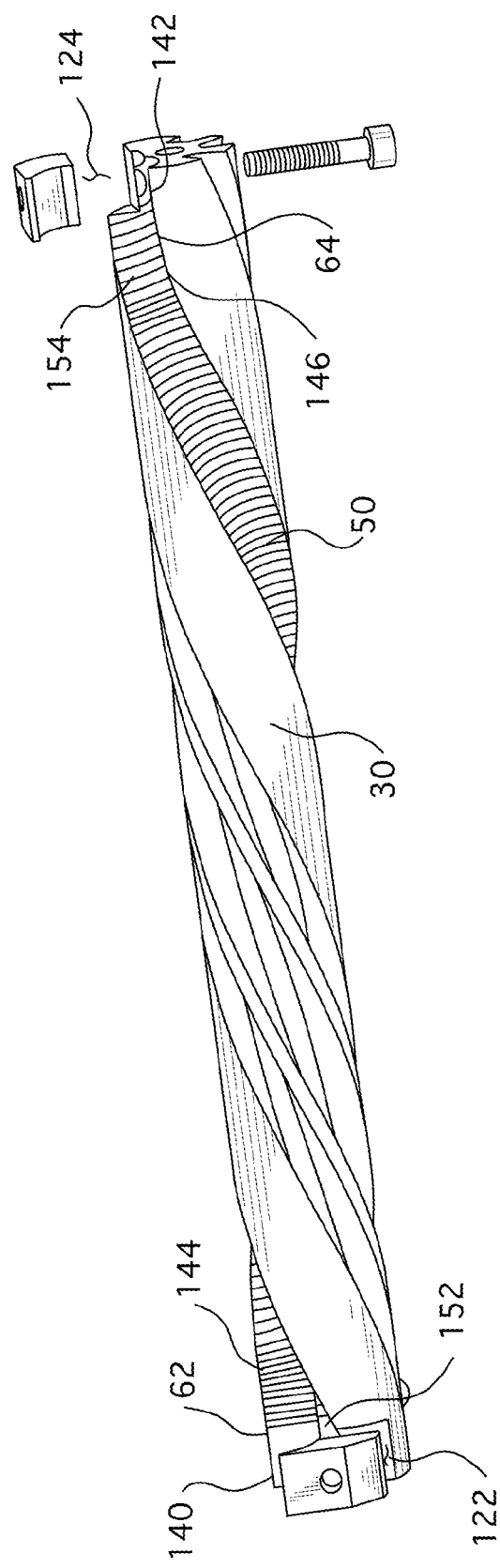
FIG. 11 is another isometric view of the clamping device of FIG. 11 on the tensioner.
Figure 12:
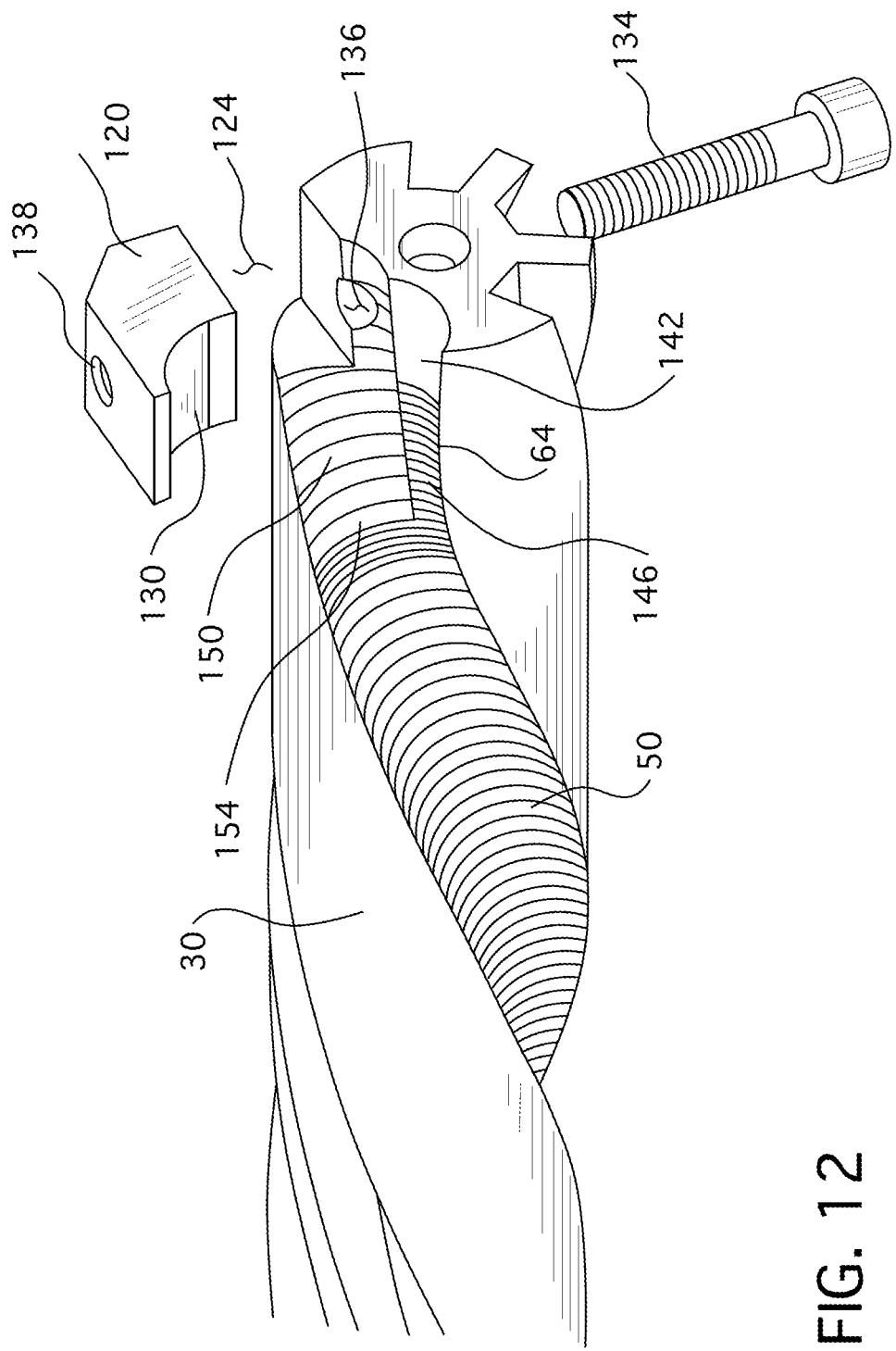
FIG. 12 is a detail isometric view of the clamping device of FIG. 11 on the tensioner.

As shown in FIGS. 8-13, the clamping device 80, 82 may also be a lug end clamp 120. In this exemplary embodiment, the body 32 includes a cutout 122, 124 at each end 36, 38. Each cutout 122, 124 is in communication with the helical path 50, That is, as used herein, "in communication" means that there is no portion of the body 32 between each cutout 122, 124 and the helical path 50. Each lug end clamp 120 includes a retaining member 126 and a coupling assembly 128. Each lug end clamp retaining member 126 is sized to generally correspond to the size of a cutout 122, 124 (FIG. 10). That is, the lug end clamp retaining member 126 does not, in an exemplary embodiment, have the same outer contour as the body 32, but the lug end clamp retaining member 126 does not extend a substantial distance beyond the outer contour as the body 32. The lug end clamp retaining member 126 further includes an engagement surface 130, described in detail below. The coupling assembly 128, in an exemplary embodiment, is a tightenable coupling assembly such as, but not limited to, a nut 132 and a bolt 134. The body 32 includes a fastener opening 136 (FIG. 12) disposed at each cutout 122, 124 which corresponds to the bolt 134. In an alternate exemplary embodiment, as shown in FIG. 12, the clamp retaining member 126 may define a threaded opening 138 into which a bolt 134 is threaded.

As noted above, the helical path 50, in an exemplary embodiment, includes axial paths 62, 64 disposed at each end 36, 38 of the body 32. This is also the location on the body 32 wherein the cutouts 122, 124 are located. Thus, but for the cutouts 122, 124, the ends 36, 38 of the body 32 would define the path 50. To maintain a defined path 50 at the location of the cutouts 122, 124, each lug end clamp 120 defines a portion of the path 50 and, in an exemplary embodiment, a portion of the axial paths 62, 64. That is, each axial path 62, 64 includes an outer portion 140, 142, which is disposed immediately adjacent the axial face of body 32, and an inner portion 144, 146, which is disposed between the axial path outer portion 140, 142 and the helical portion 60. Each lug end clamp body engagement surface 130 is shaped to correspond to a portion of the path 50 cross-sectional shape. Thus, for example, if the tension member 16 has a generally circular cross-section, the engagement surface 130 is generally arcuate. Broadly, the engagement surface 130 corresponds to the cross-sectional shape of the tension member 16. Thus, when a lug end clamp 120 is installed, each lug end clamp 120, and more specifically each lug end clamp engagement surface 130 defines a portion of the helical path 50.

Further, when a lug end clamp 120 is installed, each engagement surface 130 extends over the tension member 16. That is, in order to act as a clamping device 80, 82, including a clamping device 80, 82 that retains the tension member 16, the combination of the helical path 50 surface and the engagement surface 130 extends, in an exemplary embodiment, over an arc of between about 45 and 90 degrees, as shown 90 degrees. In this configuration, the diameter of the tension member 16 is greater than the length of the secant defined by the gap between the outer ends of engagement surface 130 and the helical path 50. Thus, the tension member 16 is captured by the lug end clamp 120.

Further, the shape of the engagement surface 130 in one exemplary embodiment is shaped so that the cross-sectional area of the helical path 50 including the lug end clamp 120 is substantially the same as, or smaller than, the cross-sectional area of the tension member 16. In this embodiment, when the lug end clamp body coupling assembly 128 is drawn tight, the lug end clamp 120 will apply bias to the tension member 16. In another embodiment, the engagement surface 130 is shaped so that the cross-sectional area of the helical path 50 including the lug end clamp 120 is larger than the cross-sectional area of the tension member 16. In this embodiment, the tension member 16 will be biased against the lug end clamp 120 for the reasons stated above.

It is noted that the clamping device 80, 82 is localized at one end of the body 32. That is, as used herein, a "localized clamping device" is a clamping device disposed at a substantially discrete location. Thus, other clamping devices, e.g. a sheath that extends over a body, such as the sheath disclosed in JP Patent No. 01110012, is not a "localized clamping device." It is further noted that although two clamping devices 80, 82 have been identified, a tension member locking structure (not shown) may be incorporated into the tensioner 30 and, as such, the tensioner 30 is usable with at least one localized clamping device 80.

The tensioner 30 may be installed when the tension member 16 is not under tension, e.g. before the tension member 16 is coupled to spaced apart points 12, 14. In such an instance, and depending upon the rigidity of the tension member 16, the tension member 16 may be wrapped about the tensioner 30 by hand More typically, however, the tensioner 30 will be installed when the tension member 16 is in use, i.e. when the tension member is coupled to spaced apart points 12, 14. For such an installation, and in an exemplary embodiment, the helical path 50 includes at least one relief portion 150. That is, as discussed below, considerable force may be required to dispose the tension member 16 in the helical path 50. Moreover, considerable force may also be required to change the direction of the tension member 16 so as to be disposed in the axial paths 62, 64. So as to avoid damaging the tension member 16 during the installation, the at least one relief portion 150 allows the tension member 16 to continue the spiral of the helical path 50 prior to being installed in an axial path 62, 64.

That is, during installation, the tension member 16 is installed in the helical path 50. In this configuration, the tension member 16 follows the spiral defined by the helical path 50. As noted above, the helical path 50, in an exemplary embodiment, includes axial paths 62, 64 disposed at each end of the body 32. When the tension member 16 is initially disposed along helical path 50, the tension member 16 forms a spiral or helix. To accommodate the tension member 16 in this configuration, the helical path 50 includes at least one relief portion 150 (FIG. 12) which is, generally, a continuation of the helical portion 60 of the helical path 50. That is, in an exemplary embodiment, the helical portion 60 has a first pitch and the at least one relief portion 150 has the same pitch. In an exemplary embodiment, there is a relief portion 150 disposed at each end 36, 38 of the body 32. That is, there is a first relief portion 152 at the first end 36 and a second relief portion 154 at the second end 38.

Figure 13:
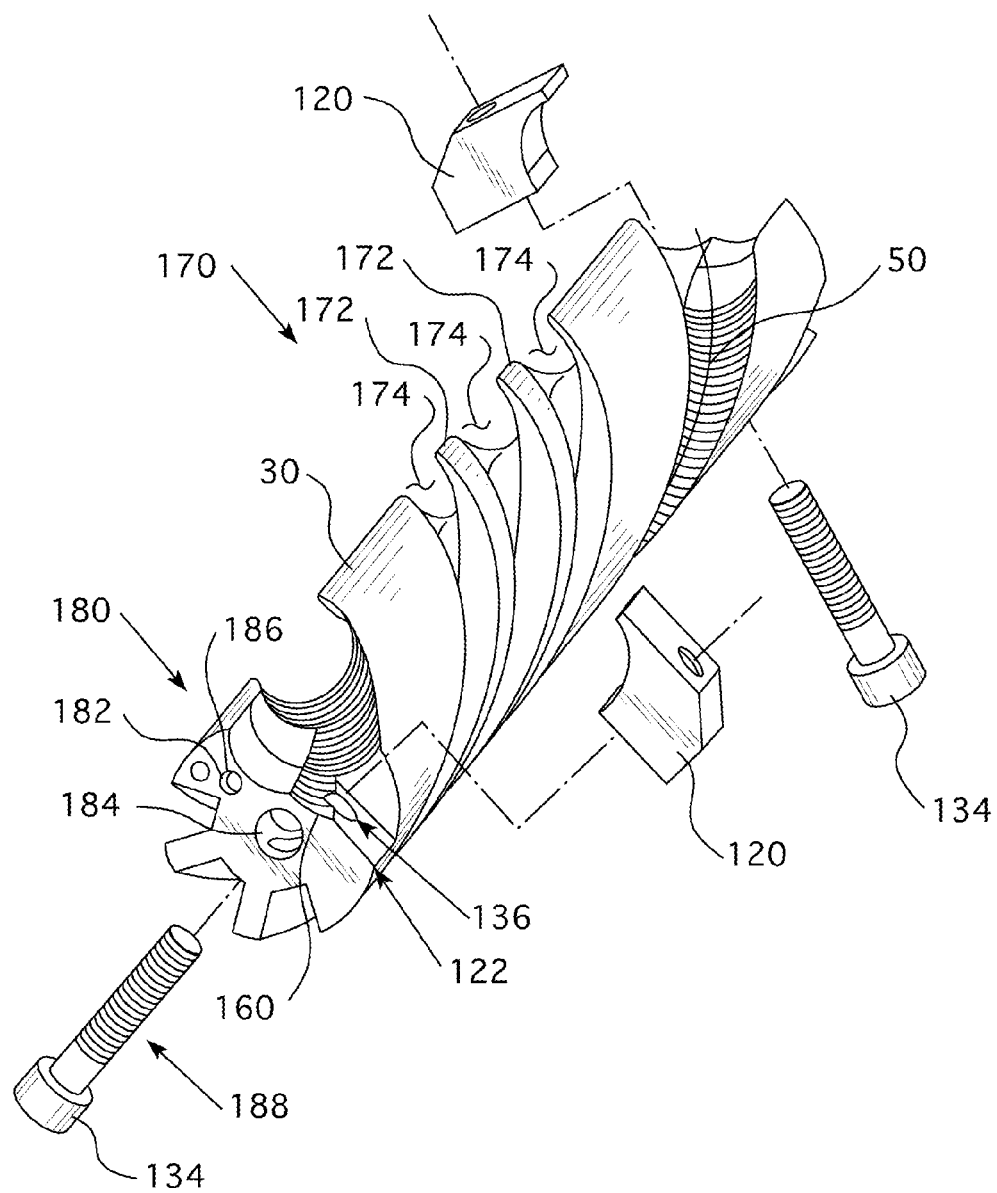
FIG. 13 is another isometric view of the clamping device of FIG. 11 on the tensioner.

The at least one relief portion 150 extends radially adjacent to an axial path 62, 64. Further, the at least one relief portion 150 diverges from the axial paths 62, 64. The surface of body 32 between an axial path 62, 64 and a relief portion 150 is, as used herein, a transitional surface 160, as shown in FIG. 13. The surface of a transitional surface 160 may be generally planar (not shown) but, in an exemplary embodiment, the surface of a transitional surface 160 is generally arcuate and has a curvature similar to the tension member 16.

The body 32 further includes a heat dissipation structure 170. In an exemplary embodiment, the heat dissipation structure 170 is a number of fins 172 disposed on, or extending from, the body 32. The fins 172, as shown, are disposed generally opposite the helical path 50. That is, the fins 172 extend helically and longitudinally along body 32 and generally opposite the helical path 50. In an exemplary embodiment, the body includes a number of heat dissipation grooves 174 that define the number of fins 172.

The body 32 further includes an installation tool mounting 180. The installation tool mounting 180, shown in FIG. 13, is, in an exemplary embodiment, one component of a coupling assembly 128. Further, the installation tool mounting 180 is structured to resist rotation of an installation tool. In an exemplary embodiment, the installation tool mounting 180 includes a threaded coupling 182 and an anti-rotation coupling 184. As shown, the threaded coupling 182 is a threaded bore 186 disposed on the axial face of the body second end 38. The threaded coupling 182, i.e. threaded bore 186, is radially spaced from the longitudinal axis of body 32. As shown, anti-rotation coupling 184 is a bore 188 disposed on the axial face of the body second end 38. The threaded coupling 182, i.e. bore 188, is disposed substantially on the longitudinal axis of body 32. It is noted that an installation tool mounting 180 may be disposed at each end, 36, 38 of body 32, but an installation tool is, in an exemplary embodiment, coupled to only one end of body 32.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A tensioner for an elongated tension member suspended between two points, said tension member having a sag and a cross-sectional shape, said tensioner comprising:
    an elongated body having an outer surface, a first end, a second end and a longitudinal axis:
    a generally helical path disposed on said body outer surface, said helical path sized to accommodate at least a portion of said tension member;
    at least one localized clamping device, said localized clamping device structured to retain said tension member in said helical path;
    wherein a portion of said tension member is disposed along said helical path, said tension member cross-sectional shape being at least partially disposed within said helical path;
    wherein the sag of said tension member is reduced;
    said at least one localized clamping device includes a first localized clamping device and a second localized clamping device;
    said first localized clamping device disposed at said body first end; and
    said second localized clamping device disposed at said body second end.

2. The tensioner of claim 1 wherein:
    each said localized clamping device includes a retaining member and a coupling assembly; and
    wherein each said retaining member is coupled to said body by said coupling assembly.

3. The tensioner of claim 2 wherein:
    said path has a cross-sectional shape; and
    said retaining member includes an engagement surface, said engagement surface corresponding to the cross-sectional shape of said tension member.

4. The tensioner of claim 3 wherein:
    at least one of said body first end and said body second end includes a cutout;
    said cutout in communication with said path;
    said retaining member disposed in said cutout; and
    wherein said engagement surface defines at least a portion of said path.

5. The tensioner of claim 1 wherein each localized clamping device is selected from a group including: a tightenable band, a lug end clamp, and a U-Bolt clamp.

6. The tensioner of claim 1 wherein:
    said helical path includes at least one axial path; and
    said at least one axial path extending generally parallel to said body longitudinal axis and disposed at said body first end.

7. The tensioner of claim 6 wherein:
    said helical path includes a first relief portion;
    wherein said first relief portion is generally a same pitch as said helical path;
    said first relief portion disposed radially adjacent said at least one axial path.

8. The tensioner of claim 1 wherein:
    said helical path includes a first axial path and a second axial path;
    each said axial path extending generally parallel to said body longitudinal axis;
    said first axial path disposed at said body first end; and
    said second axial path disposed at said body second end.

9. The tensioner of claim 8 wherein:
    said helical path includes a first relief portion and a second relief portion;
    wherein said first relief portion and said second relief portion are generally helical and generally a same pitch as said helical path;
    said first relief portion disposed radially adjacent said first axial path; and said second relief portion disposed radially adjacent said second axial path.

10. The tensioner of claim 1 wherein said body includes an installation tool mounting.

11. The tensioner of claim 10 wherein said installation tool mounting includes a threaded coupling and an anti-rotation coupling.

12. The tensioner of claim 11 wherein:
said anti-rotation coupling is a bore disposed along said body longitudinal axis; and
said threaded coupling is a threaded bore that is radially spaced from said body longitudinal axis.

13. A tensioner for an elongated tension member suspended between two points, said tension member having a sag and a cross-sectional shape, said tensioner comprising:
an elongated body having an outer surface, a first end, a second end and a longitudinal axis:
a generally helical path disposed on said body outer surface, said helical path sized to accommodate at least a portion of said tension member;
at least one localized clamping device, said localized clamping device structured to retain said tension member in said helical path;
wherein a portion of said tension member is disposed along said helical path, said tension member cross-sectional shape being at least partially disposed within said helical path;
wherein the sag of said tension member is reduced; and
wherein said body includes a heat dissipation structure.

14. The tensioner of claim 13 wherein said heat dissipation structure includes a number of fins.

15. The tensioner of claim 14 wherein said heat dissipation fins are defined by a number of heat dissipation grooves in said body.

16. The tensioner of claim 15 wherein said heat dissipation grooves extend helically over said body.

* * * * *